US009760448B1

(12) United States Patent
Per et al.

(10) Patent No.: US 9,760,448 B1
(45) Date of Patent: Sep. 12, 2017

(54) HOT RECOVERY OF VIRTUAL MACHINES

(71) Applicant: Acronis International GmBh, Shaffhausen (CH)

(72) Inventors: Yuri Per, Dolgoprudny (RU); Maxim V. Lyadvinsky, Moscow (RU); Serguei M. Beloussov, Costa Del Sol (SG); Dmitry Egorov, Fryazino (RU); Alexey Borodin, Moscow (RU); Vasily Semyonov, Moscow (RU)

(73) Assignee: ACRONIS INTERNATIONAL GMBH (CH)

( * ) Notice: Subject to any disclaimer, the term of this patent is extended or adjusted under 35 U.S.C. 154(b) by 0 days.

(21) Appl. No.: 14/320,450

(22) Filed: Jun. 30, 2014

Related U.S. Application Data (60) Provisional application No. 61/869,467, filed on Aug. 23, 2013, provisional application No. 61/869,470, filed on Aug. 23, 2013, provisional application No. 61/869,480, filed on Aug. 23, 2013.

(51) Int. Cl.
*G06F 11/00* (2006.01)
*G06F 11/14* (2006.01)

(52) U.S. Cl.
CPC ...... *G06F 11/1469* (2013.01); *G06F 11/1464* (2013.01); *G06F 2201/84* (2013.01)

(58) Field of Classification Search
CPC ............. G06F 11/1415; G06F 11/1451; G06F 11/1464; G06F 11/1466; G06F 11/1469; G06F 11/1482; G06F 11/2025; G06F 11/203; G06F 11/2257; G06F 11/263; G06F 2201/815; G06F 2201/84; G06F 2009/4557; H04L 41/08; H04L 41/0846
See application file for complete search history.

(56) References Cited

U.S. PATENT DOCUMENTS

| | | | |
|---|---|---|---|
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |

(Continued)

*Primary Examiner* — Nadeem Iqbal
(74) *Attorney, Agent, or Firm* — K&L Gates LLP (57) ABSTRACT

A method, computer program product, and computing system for hot recovery of virtual machines are described. The method may include initiating a recovery process to transfer data, from a backup archive of a virtual machine to be restored, to a virtual disk at the virtual machine host computer. The method may further include booting the virtual machine to be restored. The method may also include intercepting a read request from the virtual machine to the virtual disk at the virtual machine host computer. The method may additionally include determining if the read request from the virtual machine requested data from the virtual disk which has not yet been restored from the backup archive to the virtual disk by the recovery process. Moreover, the method may include, in response to determining that the requested data has not been restored from the backup archive to the virtual disk, returning the requested data.

20 Claims, 5 Drawing Sheets

(56) References Cited

U.S. PATENT DOCUMENTS

| | | | |
|---|---|---|---|
| 7,636,824 B1 | 12/2009 | Tormasov | |
| 7,650,473 B1 | 1/2010 | Tormasov et al. | |
| 7,721,138 B1 * | 5/2010 | Lyadvinsky | G06F 11/1417 714/10 |
| 7,779,221 B1 | 8/2010 | Tormasov et al. | |
| 7,831,789 B1 | 11/2010 | Tsypliaev et al. | |
| 7,886,120 B1 | 2/2011 | Tormasov | |
| 7,895,403 B1 | 2/2011 | Tormasov et al. | |
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,145,607 B1 | 3/2012 | Korshunov et al. | |
| 8,180,984 B1 | 5/2012 | Per et al. | |
| 8,225,133 B1 * | 7/2012 | Lyadvinsky | G06F 11/1417 714/10 |
| 8,261,035 B1 | 9/2012 | Tsypliaev et al. | |
| 8,296,264 B1 | 10/2012 | Yeresov et al. | |
| 8,312,259 B1 | 11/2012 | Dyatlov et al. | |
| 8,347,137 B1 | 1/2013 | Chepel et al. | |
| 8,453,145 B1 * | 5/2013 | Naik | G06F 9/45558 718/1 |
| 8,484,427 B1 | 7/2013 | Lyadvinsky et al. | |
| 8,645,748 B1 | 2/2014 | Chepel et al. | |
| 8,732,121 B1 | 5/2014 | Zorin et al. | |
| 8,856,927 B1 | 10/2014 | Beloussov et al. | |
| 8,996,830 B1 | 3/2015 | Lyadvinsky et al. | |
| 9,032,403 B1 * | 5/2015 | Naik | G06F 9/45558 707/609 |
| 2006/0225065 A1 | 10/2006 | Chandhok et al. | |
| 2010/0011178 A1 | 1/2010 | Feathergill | |
| 2010/0049929 A1 * | 2/2010 | Nagarkar | G06F 9/45533 711/162 |
| 2013/0185716 A1 * | 7/2013 | Yin | G06F 9/45558 718/1 |
| 2013/0232245 A1 * | 9/2013 | Antosz | G06F 8/10 709/222 |

\* cited by examiner

HOT RECOVERY OF VIRTUAL MACHINES

CROSS REFERENCE TO PRIOR APPLICATIONS

This application claims priority to and the benefit of U.S. Provisional Patent Application No. 61/869,470, filed on Aug. 23, 2013; U.S. Provisional Patent Application 61/869,467, filed on Aug. 23, 2013; and U.S. Provisional Patent Application No. 61/869,480, filed on Aug. 23, 2013, the entire contents of each of which are hereby incorporated by reference. This application is related to, and hereby incorporates by reference in their entireties, the following co-owned patent applications filed on even date herewith by Applicant Acronis International GmBh: United States Patent Application entitled "Configuring Backup and Recovery Routines in a Cloud Environment" Ser. No. 14/320,393, filed on Jun. 30, 2014; United States Patent Application entitled "Using A Storage Path To Facilitate Disaster Recovery" Ser. No. 14/320,409, filed on Jun. 30, 2014; United States Patent Application entitled "Granular Recovery Using Hot-Plug Virtual Disks" Ser. No. 14/320,422 filed on Jun. 30, 2014; United States Patent Application entitled "Snapshotless Backup" Ser. No. 14/320,496, filed on Jun. 30, 2014; United States Patent Application entitled "Recovery of Virtual Machine Files Using Disk Attachment" Ser. No. 14/320,510, filed on Jun. 30, 2014; United States Patent Application entitled "Agentless File Backup of a Virtual Machine" Ser. No. 14/320,523, filed on Jun. 30, 2014; United States Patent Application entitled "Machine Replication" Ser. No. 14/320,540, filed on Jun. 30, 2014; United States Patent Application entitled "Data Backup Parallelization" Ser. No. 14/320,546, filed on Jun. 30, 2014; and United States Patent Application entitled "Systems and Methods for Backup of Virtual Machines" Ser. No. 14/320,555, filed on Jun. 30, 2014.

TECHNICAL FIELD

The technical field may generally relate to cloud computing, and more particularly to recovery of virtual machines in a cloud environment.

BACKGROUND

Various transactions and web services may be accomplished using computing platforms based on virtual machines. As a result, in the event of a virtual machine ("VM") failure, the time to recover the VM may be a business-critical performance factor. The recovery of a VM from a backup archive may be time consuming, especially if there is a large amount of data to be transferred from the backup archive to its recovery destination. As such, the services provided by the VM may be unavailable while the VM is being recovered after failure. Accordingly, reducing the time between the failure of a VM and its recovery may be a primary goal in various business contexts.

BRIEF SUMMARY

In an embodiment, a method for hot recovery of virtual machines may include initiating, with a virtual machine host computer, a recovery process to transfer data, from a backup archive of a virtual machine to be restored, to a virtual disk at the virtual machine host computer. The method may further include booting, from the virtual disk at the virtual machine host computer, the virtual machine to be restored. The method may also include intercepting a read request from the virtual machine to the virtual disk at the virtual machine host computer. The method may additionally include determining, with the virtual machine host computer, if the read request from the virtual machine requested data from the virtual disk which has not yet been restored from the backup archive to the virtual disk by the recovery process. Moreover, the method may include, in response to determining that the requested data has not yet been restored from the backup archive to the virtual disk, returning the requested data from the backup archive to the virtual disk.

One or more of the following features may be included. The method may include intercepting a write request from the virtual machine to the virtual disk at the virtual machine host computer wherein the write request is directed to an area of the virtual disk which has not yet been restored from the backup archive. The method may also include writing data corresponding to the write request to the area of the virtual disk which has not yet been restored from the backup archive. The method may further include determining, with a file system driver, a range of sectors of the virtual disk that needs to be restored from the backup archive to restore the virtual machine in response to the read request, the read request comprising the range of sectors. The read request from the virtual machine to the virtual disk may be intercepted by a disk drive level filter. The file system driver may be a virtual small computer system interface. The requested data may be restored from the backup archive to the virtual disk by an agent.

In an embodiment, a computer program product may reside on a computer readable storage medium and may have a plurality of instructions stored on it. When executed by a processor, the instructions may cause the processor to perform operations for hot recovery of virtual machines. The operations may include initiating, with a virtual machine host computer, a recovery process to transfer data, from a backup archive of a virtual machine to be restored, to a virtual disk at the virtual machine host computer. The operations may further include booting, from the virtual disk at the virtual machine host computer, the virtual machine to be restored. The operations may also include intercepting a read request from the virtual machine to the virtual disk at the virtual machine host computer. The operations may additionally include determining, with the virtual machine host computer, if the read request from the virtual machine requested data from the virtual disk which has not yet been restored from the backup archive to the virtual disk by the recovery process. Moreover, the operations may include, in response to determining that the requested data has not yet been restored from the backup archive to the virtual disk, returning the requested data from the backup archive to the virtual disk.

One or more of the following features may be included. The operations may include intercepting a write request from the virtual machine to the virtual disk at the virtual machine host computer wherein the write request is directed to an area of the virtual disk which has not yet been restored from the backup archive. The operations may further include writing data corresponding to the write request to the area of the virtual disk which has not yet been restored from the backup archive. The operations may further include determining, with a file system driver, a range of sectors of the virtual disk that needs to be restored from the backup archive to restore the virtual machine in response to the read request, the read request comprising the range of sectors. The read request from the virtual machine to the virtual disk may be intercepted by a disk drive level filter. The file system driver may be a virtual small computer system interface. The requested data may be restored from the backup archive to the virtual disk by an agent.

In an embodiment a computing system for hot recovery of virtual machines may include one or more processors. The one or more processors may be configured to initiate, with a virtual machine host computer, a recovery process to transfer data, from a backup archive of a virtual machine to be restored, to a virtual disk at the virtual machine host computer. The one or more processors may be further configured to boot, from the virtual disk at the virtual machine host computer, the virtual machine to be restored. The one or more processors may also be further configured to intercept a read request from the virtual machine to the virtual disk at the virtual machine host computer. The one or more processors may be additionally configured to determine, with the virtual machine host computer, if the read request from the virtual machine requested data from the virtual disk which has not yet been restored from the backup archive to the virtual disk by the recovery process. Moreover, the one or more processors may be configured to, in response to determining that the requested data has not yet been restored from the backup archive to the virtual disk, return the requested data from the backup archive to the virtual disk.

One or more of the following features may be included. The one or more processors may be configured to intercept a write request from the virtual machine to the virtual disk at the virtual machine host computer wherein the write request is directed to an area of the virtual disk which has not yet been restored from the backup archive. The one or more processors may also be configured to write data corresponding to the write request to the area of the virtual disk which has not yet been restored from the backup archive. The one or more processors may be further configured to determine, with a file system driver, a range of sectors of the virtual disk that needs to be restored from the backup archive to restore the virtual machine in response to the read request, the read request comprising the range of sectors. The read request from the virtual machine to the virtual disk may be intercepted by a disk drive level filter. The file system driver may be a virtual small computer system interface. The requested data may be restored from the backup archive to the virtual disk by an agent.

In an embodiment, a method for recovery of a virtual machine while keeping the virtual machine online may include receiving a selection indicating that a backup archive of a virtual machine is to be restored to a virtual disk at a virtual machine host server computer from a storage device. The backup archive may be one of a plurality of virtual machine backup archives at the storage device. Each virtual machine backup archive may represent a point-in-time of the virtual machine to be restored. The method may further include, in response to receiving the selection, initiating, with an agent that is in communication with the virtual machine host computer, a recovery process to transfer data, from the backup archive of a virtual machine to be restored, to a virtual disk at the virtual machine host computer. The method may also include, upon initiating the recovery process and before the virtual machine has been entirely restored from the backup archive, booting, from the virtual disk at the virtual machine host computer, the virtual machine to be restored. The method may additionally include, before the virtual machine has been entirely restored from the backup archive, intercepting, with a file system driver running on the virtual machine host computer, a read request from the virtual machine to the virtual disk at the virtual machine host computer.

Moreover, the method may include determining, with the agent that is in communication with the virtual machine host computer, if the read request from the virtual machine requested data from the virtual disk which has not yet been restored from the backup archive to the virtual disk by the recovery process because the virtual machine has not been entirely restored from the backup archive. The method may further include, in response to determining that the requested data has not yet been restored from the backup archive to the virtual disk, restoring, out of order, the requested data from the backup archive to the virtual disk before the virtual machine has been entirely restored from the backup archive. The method may also include reading, from the virtual disk at the virtual machine host computer, the requested data before the virtual machine has been entirely restored from the backup archive.

In an embodiment, a system may include a virtual machine host computer that hosts a virtual machine; a virtual disk that stores virtual machine data for running the virtual machine, the virtual disk being accessible to the virtual machine host computer; and a backup archive residing on a storage device, the backup archive including backup virtual machine data for recovery of the virtual machine. The system may also include a file system driver that intercepts requests from the virtual machine to the virtual disk; and an agent, in communication with the file system driver, that restores a portion of the backup virtual machine data from the backup archive to the virtual disk in response to a determination that the virtual machine requested virtual machine data from the virtual disk that is not present on the virtual disk, wherein the portion of the backup virtual machine data corresponds to the requested virtual machine data that is not present on the virtual disk.

The details of one or more implementations are set forth in the accompanying drawings and the description below. Other features and advantages will become apparent from the description, the drawings, and the claims.

DETAILED DESCRIPTION

Overview

A cloud provider may institute backup and recovery procedures to ensure persistence of a tenant's applications, data, or other resources accessed through one or more virtual machines ("VM"). For example, a backup archive of the VM may be created and stored onsite or offsite and may include the entire content of the VM before it failed. Efficient recovery of VMs is critical for proper business operations of the cloud provider as the tenant's application demands are likely to continue in the event of a VM failure.

In some situations, the VM contents may be mounted from the backup archive and its contents may be emulated by accessing data right from the backup archive file. Mounting the VM contents from the backup archive may rely on a relatively slow NFS server which may be used to connect the backup archive to a cloud computing environment. Thus, the time before the VM services are once again available may be slower than when the VM is not mounted through the backup archive. Further, mounting the VM contents from the backup archive may only be a temporary solution because the VM may still need to be fully restored to its virtual disk so its contents can persist or live for a long time.

Also, in some situations, a replica VM may be created and powered on or booted up in case of a disaster or failure in order to bring VM services back online. Replication may impose additional storage requirements because the original VM (production VM) may still need to be maintained. Allocating the same space and resources (e.g., hardware, equipment) for the replica VM may double the requirements for storage space.

In view of the forgoing, there may be a need for a system that enables availability of the services provided by a VM that failed, during recovery of the failed VM. In various implementations, the techniques and features described in the present disclosure are directed towards systems and methods for hot recovery of VMs which may enable availability of the services provided by a VM that failed during recovery of the failed VM.

Figure 1:
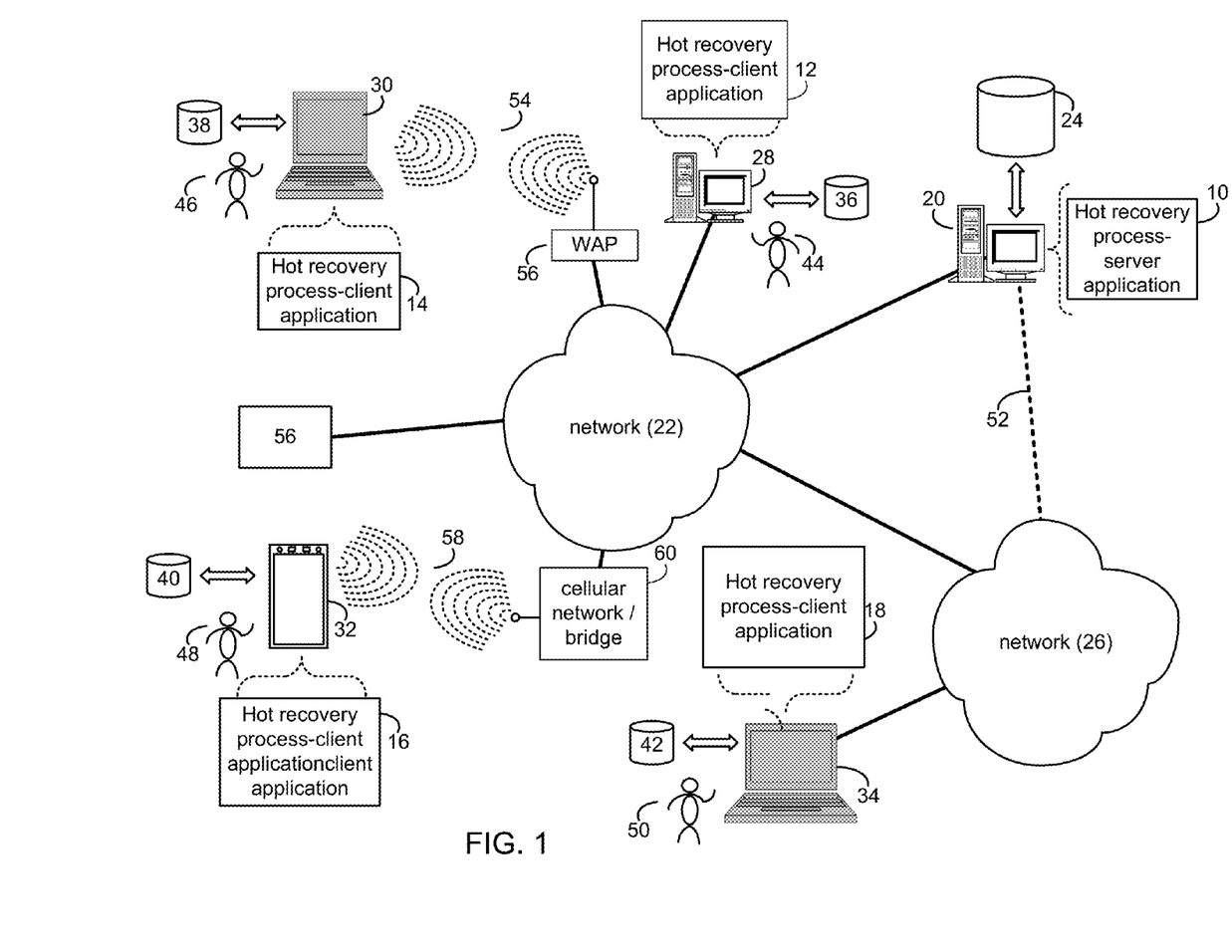
FIG. 1 depicts an example system that can execute implementations of the present disclosure.
Figure 2:
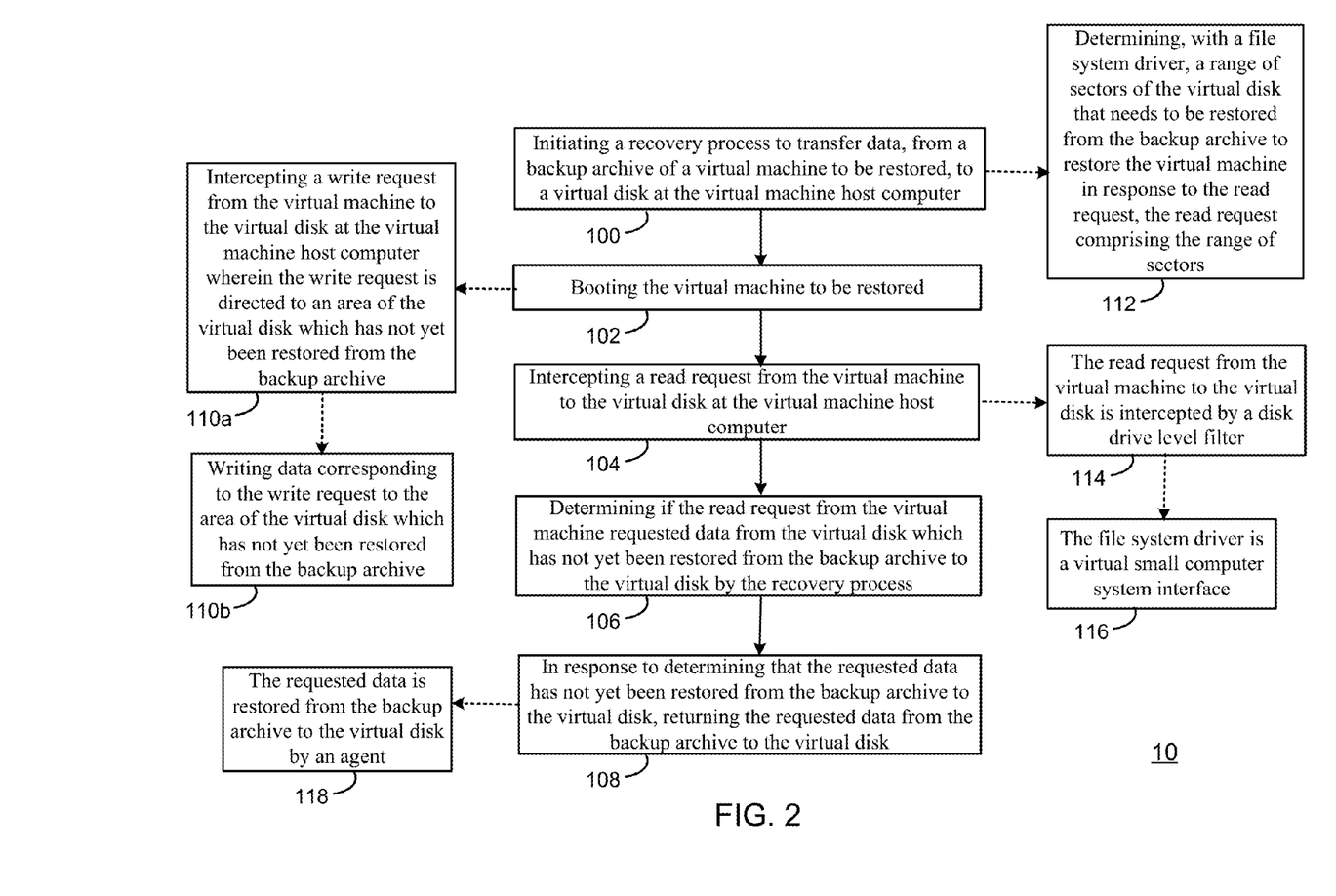
FIG. 2 is a flowchart illustrating an example process for hot recovery of a virtual machine in accordance with the present disclosure.

Referring to FIGS. 1 & 2, there is shown a server application 10 and client applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as hot recovery process 10. Further, one or more of client applications 12, 14, 16, and 18 may be referred to as a process configured to carry out one or more of the features described herein, such as hot recovery processes 12, 14, 16, and/or 18.

As will be discussed below, hot recovery process 10 may initiate 100 a recovery process to transfer data, from a backup archive of a virtual machine to be restored, to a virtual disk at the virtual machine host computer. Hot recovery process 10 may also boot 102 the virtual machine to be restored. Hot recovery process 10 may further intercept 104 a read request from the virtual machine to the virtual disk at the virtual machine host computer. Hot recovery process 10 may additionally determine 106 if the read request from the virtual machine requested data from the virtual disk which has not yet been restored from the backup archive to the virtual disk by the recovery process. Moreover, hot recovery process 10 may, in response to determining that the requested data has not yet been restored from the backup archive to the virtual disk, returning 108 the requested data from the backup archive to the virtual disk.

The hot recovery process may be a server-side process (e.g., server-side hot recovery process 10), a client-side process (e.g., client-side hot recovery process 12, client-side hot recovery process 14, client-side hot recovery process 16, or client-side hot recovery process 18), or a hybrid server-side/client-side process (e.g., a combination of server-side hot recovery process 10 and one or more of client-side hot recovery processes 12, 14, 16, 18).

System Overview

Referring to FIG. 1, server-side hot recovery process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side hot recovery process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side hot recovery processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side hot recovery processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side hot recovery processes 12, 14, 16, 18 and/or server-side hot recovery process 10 may be processes that run within (i.e., are part of) a cloud computing site, cloud computing application, cloud platform, or cloud environment. Alternatively, client-side hot recovery processes 12, 14, 16, 18 and/or server-side hot recovery process 10 may be stand-alone applications that work in conjunction with the cloud computing site, cloud computing application, cloud platform, or cloud environment. One or more of client-side hot recovery processes 12, 14, 16, 18 and server-side hot recovery process 10 may interface with each other (via network 22 and/or network 26).

Users 44, 46, 48, 50 may access server-side hot recovery process 10 directly through the device on which the client-side hot recovery process (e.g., client-side hot recovery processes 12, 14, 16, 18) is executed, namely client electronic devices 28, 30, 32, 34, for example. Users 44, 46, 48, 50 may access server-side hot recovery process 10 directly through network 22 and/or through secondary network 26. Further, server computer 20 (i.e., the computer that executes server-side hot recovery process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Hot Recovery Process

For the following discussion, server-side hot recovery process 10 will be described for illustrative purposes and server computer 20 may serve as a representation of a cloud computing site and referred to as cloud computing site 20 which includes multiple server computers (e.g., a virtual machine host computer). It should be noted that server-side hot recovery process 10 may interact with client-side hot recovery process 12 and may be executed within one or more applications that allow for communication with client-side hot recovery process 12. However, this is not intended to be a limitation of this disclosure, as other configurations are possible (e.g., stand-alone, client-side hot recovery processes and/or stand-alone server-side hot recovery processes). For example, some implementations may include one or more of client-side hot recovery processes 12, 14, 16, 18 in place of or in addition to server-side hot recovery process 10.

The systems and methods (e.g., hot recovery process 10) described herein relate to the recovery of data in a virtualized environment. In part, the systems and methods relate to decreasing the recovery time period for restoring a virtual machine and, more specifically, retaining availability of the virtual machine (VM) while it is being restored. The techniques and features described herein may reduce the recovery time period for the VM or decrease or eliminate the time during which services supported by the VM are unavailable during a VM failure when compared to transferring all the VM data from the backup archive back to the VM virtual disk for restoration during a conventional recovery process.

The systems described herein may include one or more memory elements for backup of software and databases, virtual machines, and computer storage products including instructions to be executed by a processor to cause the processor to implement the methods described herein. The systems described herein may also include a backup archive, where the VM backup file or backup contents may be located; the backup archive may be disposed in a memory, a portion of a memory, or across one or more memories.

Referring now to FIG. 1, one or more of users 44, 46, 48, and 50 may be cloud administrators at a cloud provider or may be cloud end-users. The cloud administrators may access and administer cloud computing site 20 and the cloud-end users may access and interact with cloud computing site 20 through one or more of client electronic devices 28, 30, 32, 34 (respectively). Cloud computing site 20 may run a cloud or virtualization application such as VMWare™ or may include bare-metal embedded hypervisors (e.g., VMware™ ESX™ and VMware™ ESXi™) that may run directly on server hardware at cloud computing site 20. Further, cloud computing site 20 may include a vCloud™ architecture that may enhance cooperation between hypervisors. Hot recovery process 10 may run at cloud computing site 20 and may include any number of the techniques or features described herein.

Figure 3:
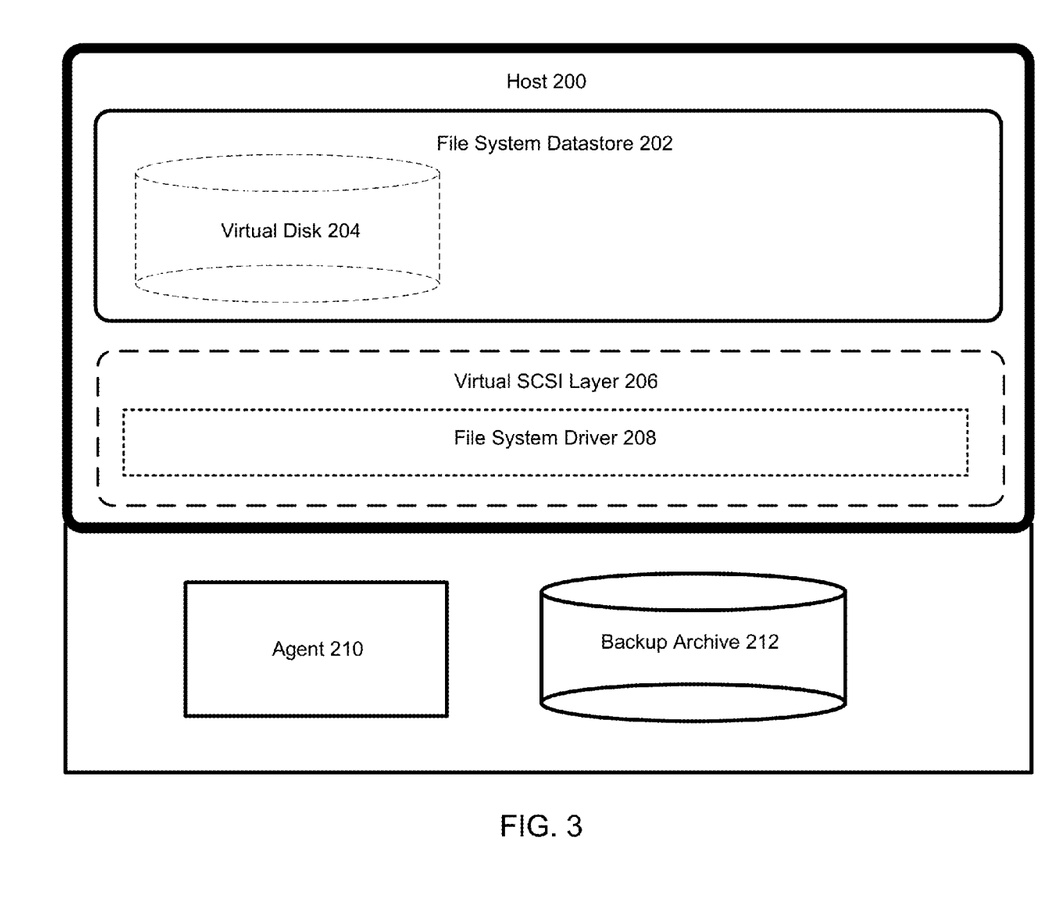
FIG. 3 depicts an example infrastructure in accordance with the present disclosure.

Referring now to FIGS. 1 & 3, cloud computing site 20 may include one or more host machines such as host 200 (e.g., a virtual machine host computer). Host 200 may be a server computer on which a hypervisor runs one or more virtual machines. Host 200 may be an ESXi host and may run the VMware™ ESXi™ hypervisor. Host 200 may use a cluster file system such as Virtual Machine File System (VMFS) or a Network File System (NFS).

For example, host 200 may include file system datastore 202, which may be based on VMFS. Datastore 202 may include one or more virtual disks such as virtual disk 204, which may be a virtual machine disk (VMDK or .vmdk) file. Virtual disk 204 may be a single disk file including the constituent data for an entire virtual machine. File system datastore 202 may be a logical representation of the storage provided by host 200. Physically, file system datastore 202 may be located on a non-virtual SCSI device in communication with host 200. Host 200 may also include a virtual small computer system interface layer (vSCSI layer 306). The file system driver is a virtual small computer system interface. vSCSI layer 206 may be a subsystem of host 200 which may enable running a vSCSI filter or file system driver on host 200. For example, file system driver 208 (which may be referred to as a "low-level file system driver) may be implemented with vSCSI layer 206 and may be configured to act as a transport layer to send (non-virtual) SCSI data to a virtual machine (VM). The VM can then act or operate on the SCSI data and can capture read and write operations sent through the vSCSI file system driver.

Small computer system interface or (SCSI) may be a standard that defines how computers can communicate with other devices, such as printers, scanners, and storage devices. By using SCSI, computers can send and receive information to and from other SCSI devices. Similarly, a vSCSI layer such as vSCSI layer 206 may enable a virtual machine to communicate with SCSI devices. For example, vSCSI layer 206 may allow a virtual machine running on host 200 to communicate with backup archive 212, which may reside on a SCSI device such as a physical storage disk or drive.

Figure 4:
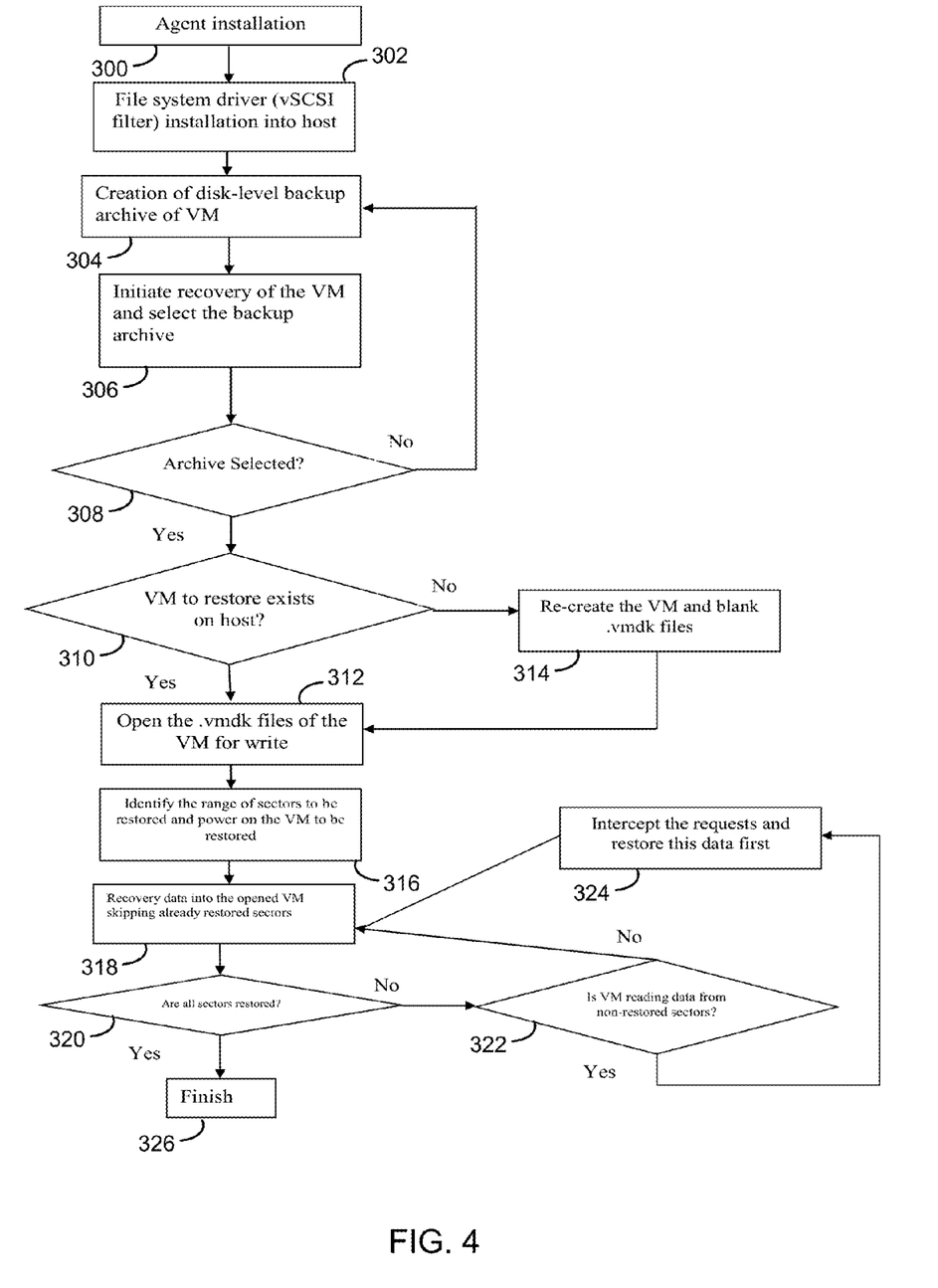
FIG. 4 is a flowchart illustrating an example process for hot recovery of a virtual machine in accordance with the present disclosure.

File system driver 208 may be (116) a low-level file system driver or vSCSI filter which may act as a transport layer to send SCSI data to a virtual machine. The virtual machine may then act or operate on the SCSI data. Referring now also to FIG. 4, and for example, the vSCSI filter may be installed (302) on host 200 and may allow for high performance reading and writing of SCSI blocks by the virtual machine. The vSCSI filter may be configured to capture input, output, read, or write requests to and from virtual disk 204. File system driver 208 (i.e., vSCSI filter) may be installed into host 200 on vSCSI layer 206. File system driver 208 may be configured to emulate vSCSI controllers for virtual machines and may work with VMFS partitions and .vmdk files or disks thereon.

Host 200 may also include or be in communication with an agent 210. Agent 210 may include a software component, executable code, function, subroutine, or other set of instructions designed to carry out one or more operations for recovery of one or more virtual machines running on host 200. Agent 210 may run on host 200 as a virtual appliance. Additionally, host 200 may include or be in communication with backup archive 212, which may include virtual machine backup data or one or more images or snapshots of one or more virtual machines running on host 200. Backup archive 212 may reside on a physical or virtual storage device and may be created by agent 210. In an embodiment, agent 210 may include one or more executables which handle interaction and coordination between the backup archive 212, host 200, file system driver 208, and a user (through, for example, a web interface). Agent 210 may receive one or more inputs which may be one or more commands from an end-user. Further, agent 210 may output commands which may be transmitted to one or more of host 200, file system driver 208, and backup archive 212.

Agent 210 may coordinate the hot recovery (or instant recovery) process and may require a separate machine where it can be run. This machine may be, for example, a virtual appliance, a Windows/Linux virtual machine, or a Windows/Linux physical machine, where the executable code of agent 210 can be executed. Agent 210 may generally be active during the whole hot recovery (or instant recovery) procedure. Agent 210 may generally be in communication with host 200 (e.g., the virtual machine host computer) throughout the hot recovery (or instant recovery) process (e.g., hot recovery process 10).

Referring now also to FIG. 4, backup archive 212 may be created (304) in advance from a virtual machine which may later need to be restored. Further, backup archive 212 may be created by reading a virtual machine virtual disk (e.g., virtual disk 204) through an application programming interface (API) such as VMware™ vStorage™ API. Backup archive 212 may include the contents of the underlying volumes of the virtual machine which may later need to be restored.

In an implementation, backup archive 212 may be created routinely by a system administrator either manually or on an automated schedule for each virtual machine hosted by host 200. There may be multiple versions of backup archive 212 that may correspond to different points-in-time for each virtual machine, which may be referred to as recovery points. Backup archive 212 may also be created by agent 210, by hot recovery process 10, or by a combination of both, as directed by the system administrator.

Agent 210 may include the instruction sets and subroutines of server-side hot recovery process 10 (or in some implementations, one or more of the client-side hot recovery processes described above) or may include other software components, executable code, functions, or subroutines required to carry out the techniques and features described herein. Referring now also to FIG. 4, Agent 210 may be installed (300) on host 200 or may run as a virtual appliance on host 200. Agent 210 may be configured to communicate with file system driver 208 and provide access to backup archive 212 where the data required to restore the failed virtual machine is stored.

File system driver 208 may be in communication with agent 210 and may be configured to intercept and substitute input, output, read, and write requests to opened/locked .vmdk files (virtual disks) in file system datastore 202 of host 200. For example, read requests by the virtual machine may be intercepted by file system driver 208 and communicated to agent 210. Agent 210 may capture the read requests from file system driver 208 using virtual machine communication interface (vMCI) sockets. If the read request calls for data from some part of the .vmdk file (virtual disk 204) that has not yet been restored, agent 210 may return and/or restore this data from backup archive 212 right away so that the read request can be accepted. For example, agent 210 may return the requested data from backup archive 212 so that the read request can be accepted, or may completely restore the requested data to the virtual disk itself.

Agent 210 may return and/or restore this data on the fly to virtual disk 204 using the vMCI sockets. As such, the virtual machine being recovered may be running at the very beginning of the recovery process because the requested data is returned and/or restored on demand to the virtual machine disk (e.g., virtual disk 204) without interrupting the virtual machine functionality. In an embodiment, vMCI sockets may be, for example, a VMware sub-system which allows interaction between a virtual machine and its underlying host (e.g., host 200), which may be similar to a simple socket implementation. The interaction between the virtual machine and its host through vMCI sockets may be possible when, for example, VMware tools are installed inside the virtual machine. vMCI sockets may enable a stream-based channel between the virtual machine and its host. Agent 210 may be executed in a virtual appliance or in, for example, a Windows-based virtual machine to enable use of vMCI sockets.

In an embodiment, the file system driver may intercept 110a a write request from the virtual machine to the virtual disk at the virtual machine host computer. The write request may be directed to an area of the virtual disk which has not yet been restored from the backup archive. Agent 210 and/or the file system driver may write data 110b corresponding to the write request to the area of the virtual disk which has not yet been restored from the backup archive.

Referring now also to FIG. 2, hot recovery process 10 (via, e.g., agent 210) may initiate 100 a recovery process to transfer data (e.g., virtual machine backup data), from backup archive 212 of a virtual machine (VM) to be restored, to virtual disk 204 at the virtual machine host computer (e.g., host 200). The virtual machine to be restored may have resided at virtual disk 204 prior to failure, or may have resided at another virtual disk in file system datastore 202. In an implementation, hot recovery process 10 may receive a selection indicating that backup archive 212 of the virtual machine is to be restored at host 200.

Referring now also to FIG. 4, the selection (306) may be received in response to receiving input from, e.g., a system administrator, or may be received from agent 210 which may have determined that backup archive 212 of the virtual machine is to be restored at host 200. Backup archive 212 may correspond to just one of many point-in-time versions of the virtual machine to be restored, or may be just one of many backup archives, each corresponding to a different virtual machine hosted by host 200. Hot recovery process 10 may determine (308) if a backup archive has been selected.

In an implementation, initiating 100 (referring also to FIG. 4 at 306) the recovery process may include creating a new virtual machine or new virtual machine disk (e.g., virtual disk 204) on host 200 to which the backup files from backup archive 212 can be written. Initiating 100 the recovery process may also include selecting an existing virtual machine or virtual machine disk (e.g., virtual disk 204) on host 200 to which the backup files from backup archive 212 can be written. Referring now also to FIG. 4, hot recovery process 10 may determine (310) if the virtual machine to restore exists on host 200, and if not, the virtual machine and (blank) corresponding .vmdk files (virtual disk) may be created (314). The corresponding .vmdk files or virtual disk files may be newly created .vmdk files which may be empty when created initially. The created or selected virtual machine disk (e.g., virtual disk 204) or .vmdk file may be opened (312) and used as the target for recovery of the virtual machine.

File system driver 208 may identify (316) a range of sectors of virtual disk 204 (which corresponds to the failed virtual machine) which need to be restored. Agent 210 may read sectors from backup archive 212 and may compare their checksums to the checksums of sectors of virtual disk 204 read by file system driver 208. In this way, hot recovery process 10 may use file system driver 208 and agent 210 to determine 112 a range of sectors of virtual disk 204 that needs to be restored from backup archive 212 to restore the virtual machine. In an implementation, the range of sectors may be returned in response to the read request, the read request comprising the range of sectors.

Hot recovery process 10 may also boot 102 the virtual machine to be restored. The virtual machine may be powered on and booted so that services provided by the virtual machine are available to users. In an implementation, in parallel, or at about the same time, agent 210 may begin to transfer data (i.e., representative of a point-in-time version of the virtual machine being restored) from backup archive 212 to file system driver 208 such that the data is written to virtual disk 204. File system driver 208 may intercept and exchange data between agent 210, host 200, and virtual disk 204. File system driver 208 may only function when the virtual machine is online, thus the virtual machine may need to be powered on and start booting up with its current disk. Virtual disk 204, which corresponds to the virtual machine being restored, may be empty or may contain no data at the beginning of the restore. At the boot up stage, the virtual machine being restored may request data from virtual disk 204 that is not present.

Recovery of the virtual machine from backup archive 212 may include a plain recovery (318) of each sector of the virtual machine disk starting from the first sector forward until there is a read request to a sector that has not yet been restored. The techniques and features of the present disclosure may be used to keep the virtual machine services available even though the requested data is not present at the virtual machine disk (e.g., virtual disk 204).

File system driver 208 may intercept all read requests by the virtual machine and transfer each read request to agent 210. Agent 210 may read the sectors corresponding to the data requested in each read request from backup archive 212 and transfer those sectors to file system driver 208. The sectors may then be written to virtual disk 204 and the virtual machine can read the data from virtual disk 204 and continue booting. The file system driver 208 may receive information from or send information to a disk drive level filter that operates layers below the file system components and drivers. A vSCSI filter/driver is an example of such a disk drive level filter/driver.

As such (referring back to FIG. 2), hot recovery process 10 may intercept 104 the read request from the virtual machine to virtual disk 204 at host 200. For example, the read request from the virtual machine to virtual disk 204 may be intercepted (114) by file system driver 208 and/or a disk drive level filter. Hot recovery process 10 may additionally determine 106 if the read request from the virtual machine requested data from virtual disk 204 which has not yet been restored from backup archive 212 to virtual disk 204 by the recovery process. As discussed above, file system driver 208 may receive the range of logical sectors of virtual disk 204 which were requested by the virtual machine. Agent 210 may access the range of sectors by number and match these sectors to data in backup archive 212. Backup archive 212 may include a full map of the sectors, corresponding sector numbers, and the virtual machine data that corresponds to each numbered sector. In this way, agent 212 may take the range of logical sectors which were requested by the virtual machine from virtual disk 204 after boot up and request the corresponding sectors from backup archive 212 for restore to virtual disk 204 during the recovery process.

In an embodiment, when the virtual machine boots up and there is a read request to a sector of a corresponding virtual disk which has not yet been restored from the backup archive, return or restoration of that sector may be forced right away so that the virtual machine can read it. The virtual machine may wait for that sector to be returned or restored rather than failing the read request due to missing data.

As such, hot recovery process 10 may, in response to determining that the requested data has not yet been restored from backup archive 212 to virtual disk 204, return the requested data and/or restore 108 the requested data from backup archive 212 to the virtual disk 204. Hot recovery process 10 may restore the requested data by transferring the sectors requested by the virtual machine from backup archive 212 to virtual disk 204. Further, hot recovery process 10 may write those sectors to virtual disk 204 (i.e., a .vmdk file).

Once the data that was requested by the virtual machine during boot up, but that is not present in virtual disk 204, has been returned or restored using the techniques and features described herein, plain recovery of the virtual machine may continue. Each sector may be restored from backup archive 212 to virtual disk 204 in order. Agent 210 may skip (318) recovery of any sectors during plain recovery which were restored out of order if they were requested by the virtual machine but were not present in virtual disk 204 (thus restored out of order).

If there is again a read request by the virtual machine for data not yet present in virtual disk 204, agent 210 may again return the requested data and/or restore the requested data out of order from backup archive 212 to virtual disk 204.

This process may continue until all sectors and the entire virtual machine has been restored from backup archive 212 to virtual disk 204.

Referring again to FIG. 4, agent 210 may determine (320) if all sectors have been restored. If all sectors have not been restored, agent 210 may determine (322) if the virtual machine is reading data from sectors that have not been restored. As described above, if it is determined that the virtual machine is requesting data from sectors that have not been restored, file system driver 208 and agent 210 intercept (324) those requests and return the requested data and/or restore the requested data from backup archive 212 to virtual disk 204 first, and recovery (318) of data from backup archive 212 to virtual disk 204 continues until finished (326).

Using the techniques and features described herein, a failed virtual machine being recovered may become available almost instantly from the virtual machine power on event, which may occur right when the recovery is initiated. The services supported by the virtual machine before failure may become available much sooner than during a conventional restore because, in a conventional restore, all of the virtual machine data must be restored before the virtual machine can be booted up and become available.

Figure 5:
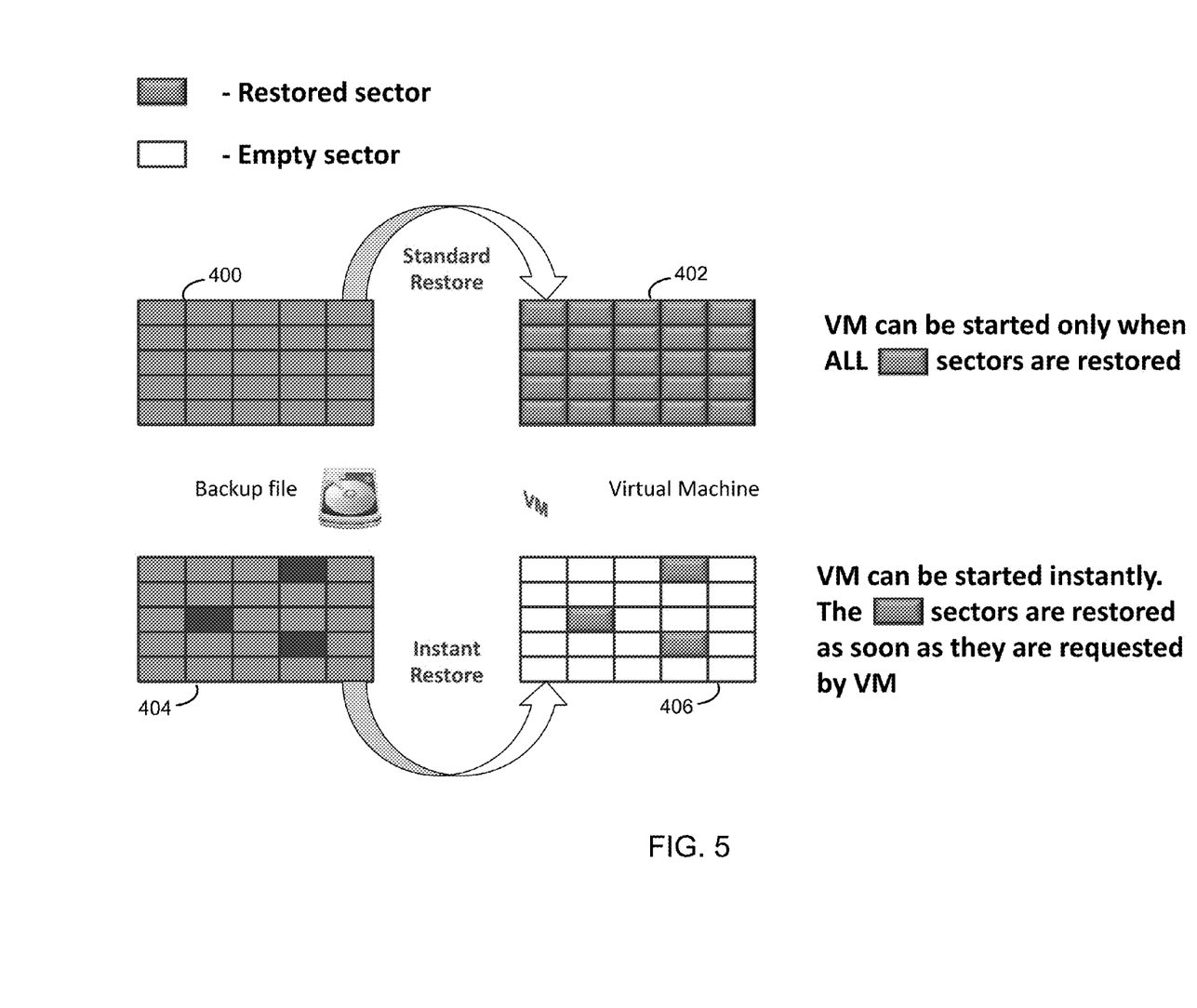
FIG. 5 depicts an example illustration of hot recovery of a virtual machine by sector in accordance with the present disclosure.

As shown in FIG. 5, during a standard restore, virtual machine 402 can only be started when all sectors are restored from backup file 400. Using the techniques and features described herein for hot recovery (or instant recovery) of virtual machines, virtual machine 406 can be started instantly because sectors are returned and/or restored from backup file 404 (e.g., a backup archive) as soon as they are requested by virtual machine 406. The standard restore process may restore all sectors and may be more time consuming relative to an instant restore. In the instant or hot restore, the virtual machine may start substantially instantaneously, or with a small delay, and the sectors may be returned and/or restored as soon as they are requested without having to restore all of the sectors to start the virtual machine.

Exemplary Software and Hardware Related Implementations

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "agent," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for hot recovery of virtual machines comprising:
    initiating, with a virtual machine host computer, a recovery process to transfer data, from a backup archive of a virtual machine to be restored, to a virtual disk at the virtual machine host computer;
    booting, from the virtual disk, the virtual machine to be restored;
    intercepting a read request from the virtual machine to the virtual disk, wherein the read request is intercepted using a virtual machine communication interface socket;
    determining, with the virtual machine host computer, if the read request from the virtual machine requested data from the virtual disk which has not yet been restored from the backup archive to the virtual disk by the recovery process; and
    in response to determining that the requested data has not yet been restored from the backup archive to the virtual disk, returning the requested data from the backup archive to the virtual disk.

2. The method of claim 1, further comprising:
    intercepting a write request from the virtual machine to the virtual disk, wherein the write request is directed to an area of the virtual disk which has not yet been restored from the backup archive; and
    writing data corresponding to the write request to the area of the virtual disk which has not yet been restored from the backup archive.

3. The method of claim 1, further comprising:
    determining, with a file system driver, a range of sectors of the virtual disk that needs to be restored from the backup archive to restore the virtual machine in response to the read request, the read request comprising the range of sectors, wherein the range of sectors is determined by comparing checksums of sectors from the backup archive with checksums of sectors of the virtual disk.

4. The method of claim 1, wherein the read request from the virtual machine to the virtual disk is intercepted by a disk drive level filter.

5. The method of claim 3, wherein the file system driver is a virtual small computer system interface filter.

6. The method of claim 1, wherein the requested data is restored from the backup archive to the virtual disk by an agent.

7. A computer program product residing on a non-transitory computer readable storage medium having a plurality of instructions stored thereon, which, when executed by a processor, cause the processor to perform operations for hot recovery of virtual machines, the operations comprising:
   initiating, with a virtual machine host computer, a recovery process to transfer data, from a backup archive of a virtual machine to be restored, to a virtual disk at the virtual machine host computer;
   booting, from the virtual disk, the virtual machine to be restored;
   intercepting a read request from the virtual machine to the virtual disk;
   determining, with the virtual machine host computer, if the read request from the virtual machine requested data from the virtual disk which has not yet been restored from the backup archive to the virtual disk by the recovery process; and
   in response to determining that the requested data has not yet been restored from the backup archive to the virtual disk, returning the requested data from the backup archive to the virtual disk, wherein the requested data is returned to the virtual disk using a virtual machine communication interface socket.

8. The computer program product of claim 7, wherein the operations further comprise:
   intercepting a write request from the virtual machine to the virtual disk, wherein the write request is directed to an area of the virtual disk which has not yet been restored from the backup archive; and
   writing data corresponding to the write request to the area of the virtual disk which has not yet been restored from the backup archive.

9. The computer program product of claim 7, wherein the operations further comprise:
   determining, with a file system driver, a range of sectors of the virtual disk that needs to be restored from the backup archive to restore the virtual machine in response to the read request, the read request comprising the range of sectors, wherein the range of sectors is determined by comparing checksums of sectors from the backup archive with checksums of sectors of the virtual disk.

10. The computer program product of claim 7, wherein the read request from the virtual machine to the virtual disk is intercepted by a disk drive level filter.

11. The computer program product of claim 10, wherein the file system driver is a virtual small computer system interface filter.

12. The computer program product of claim 7, wherein the requested data is restored from the backup archive to the virtual disk by an agent.

13. A computing system for hot recovery of virtual machines, the computing system comprising one or more processors, wherein the one or more processors are configured to:
   initiate, with a virtual machine host computer, a recovery process to transfer data, from a backup archive of a virtual machine to be restored, to a virtual disk at the virtual machine host computer;
   boot, from the virtual disk, the virtual machine to be restored;
   intercept a read request from the virtual machine to the virtual disk, wherein the read request is intercepted using a virtual machine communication interface socket;
   determine, with the virtual machine host computer, if the read request from the virtual machine requested data from the virtual disk which has not yet been restored from the backup archive to the virtual disk by the recovery process; and
   in response to determining that the requested data has not yet been restored from the backup archive to the virtual disk, return the requested data from the backup archive to the virtual disk, wherein the requested data is returned to the virtual disk using a virtual machine communication interface socket.

14. The computing system of claim 13, wherein the one or more processors are further configured to:
   intercept a write request from the virtual machine to the virtual disk, wherein the write request is directed to an area of the virtual disk which has not yet been restored from the backup archive; and
   write data corresponding to the write request to the area of the virtual disk which has not yet been restored from the backup archive.

15. The computing system of claim 13, wherein the one or more processors are further configured to:
   determine, with a file system driver, a range of sectors of the virtual disk that needs to be restored from the backup archive to restore the virtual machine in response to the read request, the read request comprising the range of sectors, wherein the range of sectors is determined by comparing checksums of sectors from the backup archive with checksums of sectors of the virtual disk.

16. The computing system of claim 13, wherein the read request from the virtual machine to the virtual disk is intercepted by a disk drive level filter.

17. The computing system of claim 16, wherein the file system driver is a virtual small computer system interface filter.

18. The computing system of claim 13, wherein the requested data is restored from the backup archive to the virtual disk by an agent.

19. A method for recovery of a virtual machine while keeping the virtual machine online, the method comprising:
   receiving a selection indicating that a backup archive of a virtual machine is to be restored to a virtual disk at a virtual machine host computer from a storage device, wherein the backup archive is one of a plurality of virtual machine backup archives at the storage device, each representing a point-in-time of the virtual machine to be restored;
   in response to receiving the selection, initiating, with an agent that is in communication with the virtual machine host computer, a recovery process to transfer data, from the backup archive of a virtual machine to be restored, to the virtual disk;
   upon initiating the recovery process and before the virtual machine has been entirely restored from the backup archive, booting, from the virtual disk, the virtual machine to be restored;
   before the virtual machine has been entirely restored from the backup archive, intercepting, with a file system driver running on the virtual machine host computer, a read request from the virtual machine to the virtual disk, wherein the read request is intercepted using a virtual machine communication interface socket;

determining, with the agent that is in communication with the virtual machine host computer, if the read request from the virtual machine requested data from the virtual disk which has not yet been restored from the backup archive to the virtual disk by the recovery process;

in response to determining that the requested data has not yet been restored from the backup archive to the virtual disk, restoring, out of order, the requested data from the backup archive to the virtual disk before the virtual machine has been entirely restored from the backup archive; and reading, from the virtual disk, the requested data before the virtual machine has been entirely restored from the backup archive.

20. A system comprising:

a virtual machine host computer that hosts a virtual machine;

a virtual disk that stores virtual machine data for running the virtual machine, the virtual disk being accessible to the virtual machine host computer;

a backup archive residing on a storage device, the backup archive including backup virtual machine data for recovery of the virtual machine;

a file system driver that intercepts read requests from the virtual machine to the virtual disk, wherein the read requests are intercepted using a virtual machine communication interface socket; and an agent, in communication with the file system driver, that restores a portion of the backup virtual machine data from the backup archive to the virtual disk in response to a determination that the virtual machine requested virtual machine data from the virtual disk that is not present on the virtual disk, wherein the portion of the backup virtual machine data corresponds to the requested virtual machine data that is not present on the virtual disk.

* * * * *